US006771799B2

(12) United States Patent
Mertens et al.

(10) Patent No.: US 6,771,799 B2
(45) Date of Patent: Aug. 3, 2004

(54) FOREGROUND/BACKGROUND DETECTOR

(75) Inventors: Mark Jozef Willem Mertens, Eindhoven (NL); Gerard De Haan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 579 days.

(21) Appl. No.: 09/858,009

(22) Filed: May 15, 2001

(65) Prior Publication Data

US 2002/0085096 A1 Jul. 4, 2002

(30) Foreign Application Priority Data

May 18, 2000 (EP) ............................................. 00201752
Feb. 16, 2001 (EP) ............................................. 01200559

(51) Int. Cl.$^7$ ................................................ G06K 9/00
(52) U.S. Cl. ........................ 382/107; 348/97; 348/155; 348/699
(58) Field of Search ................................ 382/103, 107, 382/149, 197, 236, 253, 287; 348/97, 154, 155, 208.1, 208.2, 208.4, 208.16, 352, 585, 699

(56) References Cited

U.S. PATENT DOCUMENTS

| | | | | |
|---|---|---|---|---|
| 4,862,259 A | * | 8/1989 | Gillard et al. | ............... 348/699 |
| 4,864,398 A | * | 9/1989 | Avis et al. | ................... 348/443 |
| 5,969,755 A | * | 10/1999 | Courtney | .................... 348/143 |
| 6,480,615 B1 | * | 11/2002 | Sun et al. | .................... 382/103 |
| 6,496,598 B1 | * | 12/2002 | Harman | ....................... 382/154 |

OTHER PUBLICATIONS

Pelagotti et al., "High quality picture rate up–conversion for video on TV and PC" Proc. Philips Conf. on Digital Signal Processing, Nov. 1999, Paper 4.1, Veldhoven (NL), 'Online' pp. 1–7.*

* cited by examiner

Primary Examiner—Bhavesh M. Mehta
Assistant Examiner—Abolfazl Tabatabai

(57) ABSTRACT

A detector for detecting the foreground or background vector near a discontinuity in a vector field has a covering-uncovering detector (3) for determining whether covering or uncovering situation exists. The detector further has calculating means (1,2,4) for calculating at the position $\vec{x}_1$ of the discontinuity:

a first position $\vec{x}_a$ in the previous (covering) or next (uncovering) vector field by shifting $\vec{x}_1$ over the first vector at one side of the discontinuity, a second position $\vec{x}_b$ in the previous (covering) or next (uncovering) vector field by shifting $\vec{x}_1$ over the second vector at the other side of the discontinuity and a third intermediate position between $\vec{x}_a$ and $\vec{x}_b$. Furthermore, the detector has means (5) for fetching the background vector with $\vec{v}_{a_v}$ at the third position in the previous (covering) or next (uncovering) vector field.

11 Claims, 4 Drawing Sheets

FOREGROUND/BACKGROUND DETECTOR

BACKGROUND OF THE INVENTION

FIELD OF THE INVENTION

The invention relates to a method for detecting the foreground or background vector near a discontinuity in a vector field.

In several technical fields of imaging technics it is required to know which velocity around an object edge or velocity discontinuity is the foreground velocity and which is the background velocity.

SUMMARY OF THE INVENTION

The invention has as an object to provide a method for detecting said velocities.

According to a first strategy of the invention said object is achieved in that it is determined whether covering or uncovering situation exists, that at the position $\vec{x}_1$ of the discontinuity a first position $\vec{x}_a$ in the previous (covering) or next (uncovering) vector field is calculated by shifting $\vec{x}_1$ over the first vector at one side of the discontinuity, a second position $\vec{x}_b$ in the previous (covering) or next (uncovering) vector field is calculated by shifting $\vec{x}_1$ over the second vector at the other side of the discontinuity and a third intermediate position between $\vec{x}_a$ and $\vec{x}_b$ is calculated, in which the vector fetched with $v_{\vec{a}}$ vat the third position in the previous (covering) or next (uncovering) vector field is the background vector.

According to a second strategy of the invention said object is achieved in that it is determined whether covering or uncovering situation exists, and that two positions on either side of the discontinuity are projected to the previous (uncovering) or next (covering) vector field, in which a background velocity is identified as a velocity which crosses the velocity discontinuity and projects to a foreground velocity in the previous picture, whereas a foreground velocity projects to itself.

According to the third strategy of the invention said object is achieved in that it is determined whether covering or uncovering situation exists, that the discontinuity is projected to the previous vector field in the covering situation and to the future vector field in the uncovering situation, near discontinuities it is tested whether the mentioned edge has moved over the first vector on one side of the discontinuity, or over the second vector on the other side of the discontinuity, and that in case the discontinuity moves with the first (second) vector, the second (first) vector is the background vector $v_{\vec{B}}G$.

The invention further relates to a foreground/background detector having corresponding features.

Further elaborations of the invention are specified in the dependent subclaims.

The invention will be described in more detail with reference to the attached drawings.

DETAILED DESCRIPTION OF THE PREFERRED EMBODIMENTS

The invention can be applied in various technical fields. Examples are: picture rate conversion, where it is necessary to determine the foreground and background in a motion estimator (see copending application of the inventor: tritemporal motion estimator). Typical devices for this application are TV and PC.

3D disparity analysis, where images are generated by a rolling camera or from a rolling scene, or multiple cameras (at least 3)

motion based compression where foreground and background regions are described/compressed differently. An example is compression in MPEG.

video analysis e.g. for security, where e.g. a foreground person is detected and tracked.

special effects, where certain foreground or background objects are extracted, manipulated etc.

picture enhancement e.g. blurring or deblurring of background.

Figure 1:
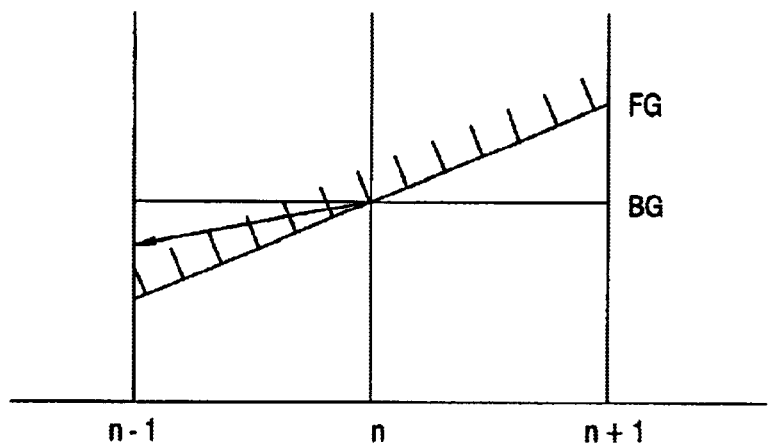
FIGS. 1 and 2 illustrate an embodiment according to the invention of a method for detecting foreground/background in uncovering and covering respectively.
Figure 2:
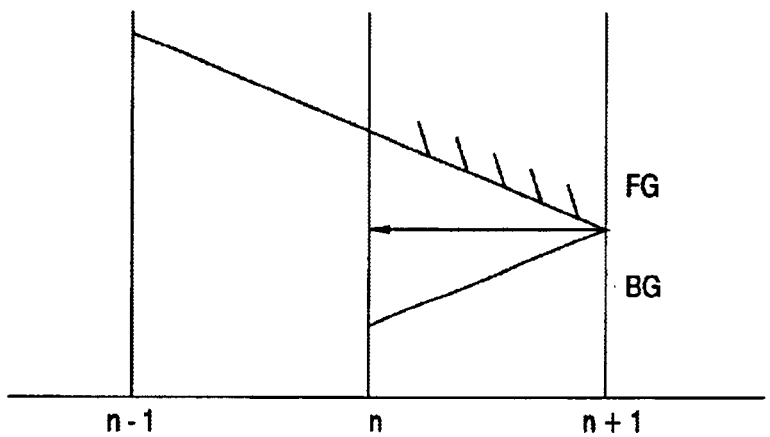

In a first strategy shown in FIGS. 1 and 2, the average vector foreground/background determination, we make use of the fact that any vector $v_{fetch} = kv_{\vec{F}G} + (1-k)v_{\vec{B}}G$, where k is smaller than 1 and $v_{\vec{F}}G$ and $v_{\vec{B}}G$ are the velocities of the foreground and background objects at position $\vec{x}$, fetches a background velocity from the previous vector field in the case of covering and a foreground velocity in the case of uncovering. The safest vector to use is the average vector $\vec{v}_{av} = 0.5v_{\vec{F}}G + 0.5v_{\vec{B}}G$. More formally, for covering, we calculate the two possible $\vec{x}_a$ and $\vec{x}_b$ of the edge in the previous image pair, e.g. for covering and a vertical edge at position $\vec{x}_E$ in vector field n:

$$\vec{x}_a = \vec{x}_E + \vec{D}\left(\vec{x} - \begin{pmatrix}1\\0\end{pmatrix}, n\right) \quad (1)$$

$$\vec{x}_b = \vec{x}_E + \vec{D}\left(\vec{x} + \begin{pmatrix}1\\0\end{pmatrix}, n\right)$$

and fetch the vector present at an intermediate position in the previous vector field (covering) in the ambiguous area:

$$\vec{D}_a(\vec{x}, n) = \vec{D}\left(\frac{\vec{x}_a + \vec{x}_b}{2}, n-1\right) \quad (2)$$

If we need to fill in the foreground vector in an ambiguous area of an interpolation vector field, we choose between $\vec{x}_a$ and $\vec{x}_b$ the one which is most different from $\vec{D}_a(\vec{x}, n)$.

A variant of this first strategy fetches the background vector from the future for uncovering:

$$\vec{D}_a(\vec{x}, n) = \vec{D}\left(\frac{\vec{x}_a + \vec{x}_b}{2}, n\right) \quad (3)$$

with:

$$\vec{x}_a = \vec{x}_1 - \vec{D}\left(\vec{x} - \begin{pmatrix}1\\0\end{pmatrix}, n-1\right) \vec{x}_b = \vec{x}_1 - \vec{D}\left(\vec{x} + \begin{pmatrix}1\\0\end{pmatrix}, n-1\right) \quad (4)$$

Figure 3:
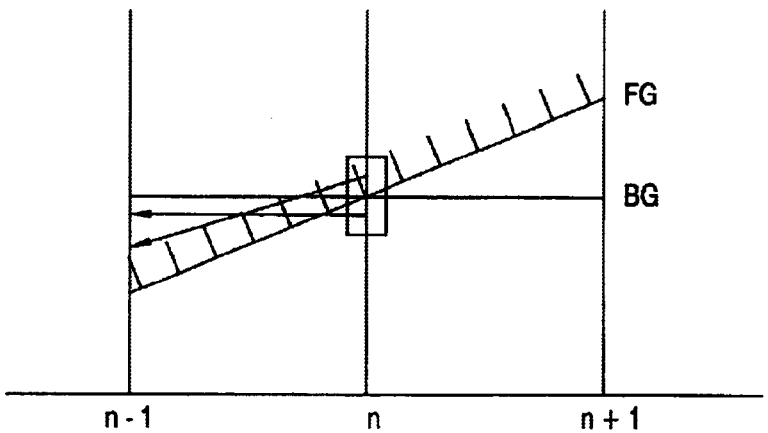
FIGS. 3 and 4 illustrate another embodiment according to the invention of a method for detecting foreground/background in uncovering and covering respectively.
Figure 4:
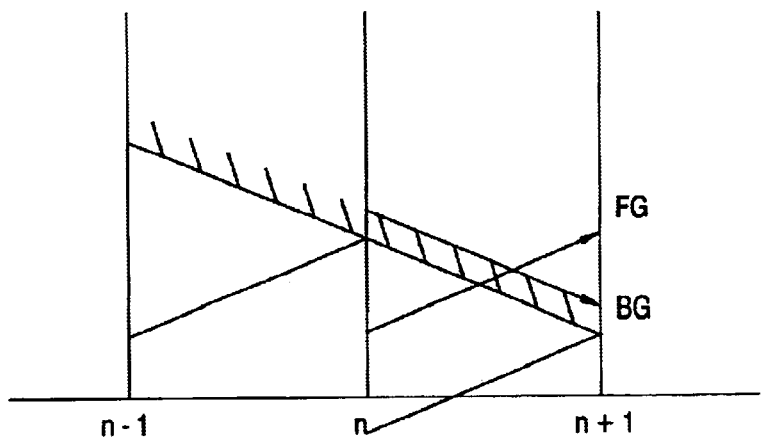

A second strategy (see FIGS. 3 and 4), the twosided self speed foreground/background determination, uses the fact that for uncovering, positions projected to the past with the background velocity have a higher probability of crossing towards the foreground region than when they are projected with $\vec{v}_{av}$. This is interesting when small relative velocities $v_{\vec{F}}G-v_{\vec{B}}G$or inaccurately estimated vector fields occur. Because we do not know a priori which velocity is the background velocity, we project the two positions on either side of the edge with its own velocity $v_{self}$ (see FIG. 3). As we can see for the ideal case, the lower velocity changes from the background velocity at n to the foreground velocity at n−1. The probability that a block in foreground in n projects to foreground in n−1 is so high that for practical reasons we can consider it to be 1. All the other probable decisions are shown in table 1.

TABLE 1

| Upper block is in reality: | foreground | background |
| --- | --- | --- |
| Decision for upper block | FG | FG or BG |
| Decision for lower block | FG or BG | FG |

In case the two projections yield the same (foreground) vector, we have a certain determination. If this vector equals the vector of the upper block, this vector is the foreground velocity vector and vice versa. In case the vectors are different, the method was unsuccessful, and yields an uncertain determination. A similar projection towards the future can be applied for the case of covering.

Figure 5:
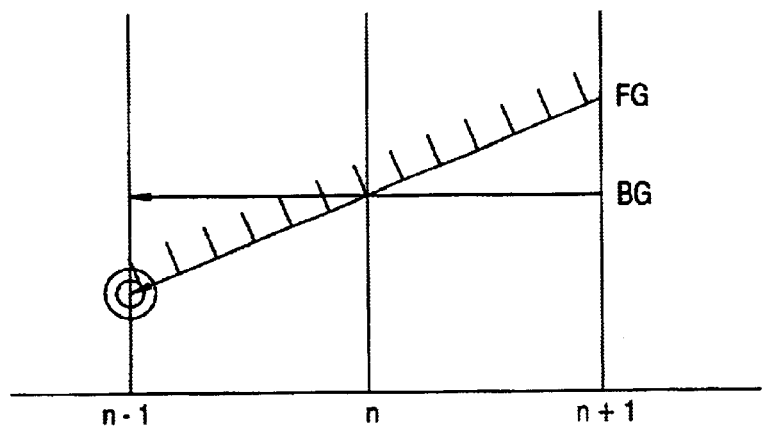
FIGS. 5 and 6 show a further embodiment according to the invention of a method for detecting foreground/background in uncovering and covering respectively.
Figure 6:
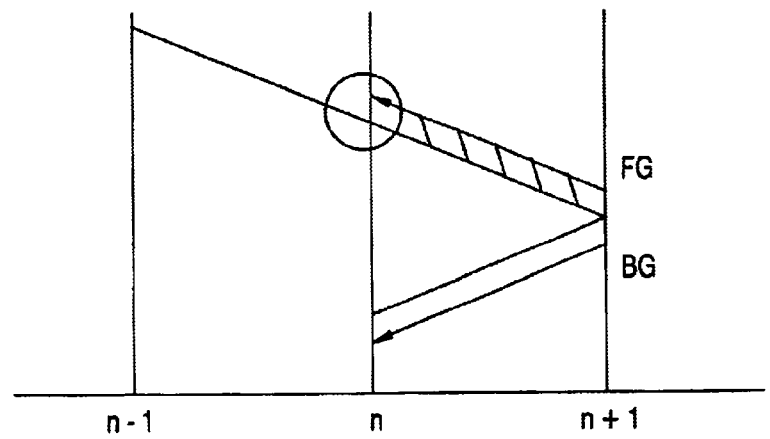

A third strategy (see FIGS. 5 and 6), the edge projection foreground/background determination, checks for e.g. uncovering whether the edge between $v_{\vec{F}}G$and $v_{\vec{B}}G$in the previous image n is present at position a or b (see FIG. 5). If the edge is detected at position a, $$v_{\vec{FG}} = \vec{D}\left(\vec{x} - \begin{pmatrix}1\\0\end{pmatrix}, n \pm 1\right)$$

and vice versa. Care should be taken that the velocities in n−1 are the same velocities as in n, since other velocity edges can occur in the vicinity of the projection. Obviously again the principle can be applied by substituting uncovering for covering and the future for the past (see FIG. 6).

It should be noted that the strategies can be enhanced incorporating match errors. In case a crossing to the foreground region occurred, the match errors of the vector in that block should be low. In case we project to a background region that was erroneously allotted a foreground vector in the previous image, the errors should be higher.

Figure 7:
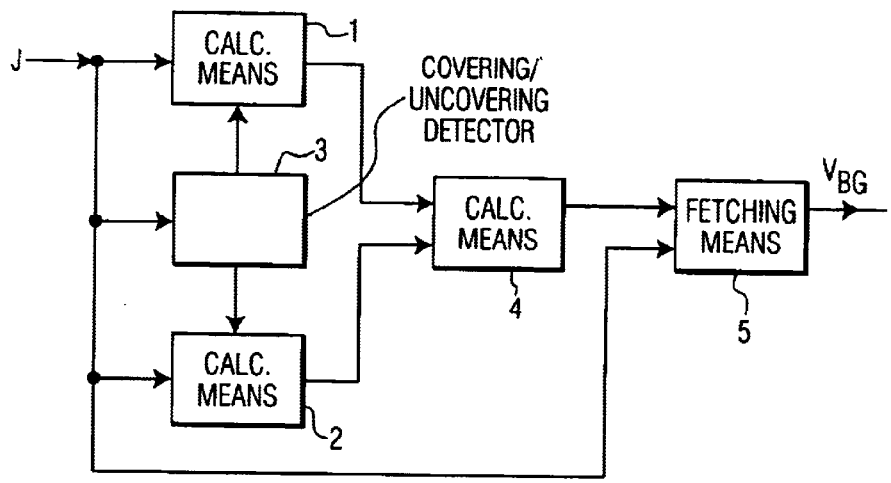
FIG. 7 shows an embodiment of a foreground/background detector according to the invention.

In FIG. 7 an embodiment of a foreground/background detector according to the invention is shown. This detector comprises calculating means 1 and 2 to which the image signal J is supplied for carrying out a calculation at a position $\vec{x}_1$ of a velocity edge. The calculating means 1 calculates a first position $\vec{x}_a$ in the previous (covering) or next (uncovering) image by shifting $\vec{x}_1$ over the first vector at one side of the edge, while the calculating means 2 calculates a second position $\vec{x}_b$ in the previous (covering) or next (uncovering) image by shifting $\vec{x}_1$ over the second vector at the other side of the edge. The choice between previous and next images is carried out by a covering/uncovering detector 3.

The outputs of the calculating means 1 and 2 are connected to the inputs of calculating means 4, which calculates a third intermediate position between $\vec{x}_a$ and $\vec{x}_b$.

The foreground/background detector of FIG. 7 is further provided with fetching means 5, one input of which is connected to the output of means 4 for calculating the third position, while to the other input of which the image signal J is supplied. From the output of the fetching means 5 the background velocity $V_{BG}$ could be derived. The fetching means 5 fetches with the velocity at the third position the background vector from the previous (covering) or next (uncovering) image. This vector is filled in those regions of the image in the environment of the edge, to which no vector is projected, in case the background vector $v_{\vec{F}}G$should be filled in and the vector chosen between $$\vec{D}\left(\vec{x} - \begin{pmatrix}1\\0\end{pmatrix}, n\right) \text{ and } \vec{D}\left(\vec{x} + \begin{pmatrix}1\\0\end{pmatrix}, n\right)$$

which is most different from $v_{\vec{a}}$vis filled in, in case a foreground vector $v_{\vec{F}}G$should be filled in. According to a further elaboration the third intermediate position is ($\vec{x}_a$+ $\vec{x}_b$)/2.

Figure 8:
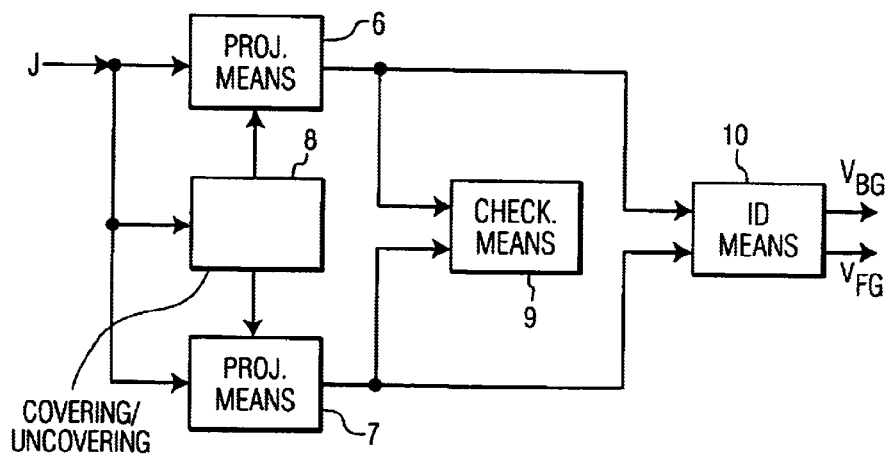
FIG. 8 shows another embodiment of a foreground/background detector according to the invention.

Another embodiment of a foreground/background detector is shown in FIG. 8. This detector comprises projecting means 6, 7 to the input of which an image signal J is supplied. These projecting means 6, 7 are controlled by a covering/uncovering detector 8 to which also the image signal J is supplied. The control operation of the covering/uncovering detection is such that the projecting means 6 projects one position at one side of the velocity edge to the previous (covering) or next (uncovering) image, while the projecting means 7 projects the position of the other side of the velocity edge to the previous (covering) or next (uncovering) image. Identification means 10 is connected to the projecting means 6 and 7, at the output of which the background velocity $V_{\vec{B}}G$and the foreground velocity V $_{\vec{F}}G$could be derived. This identification means 10 identifies a background velocity as a velocity which crosses the velocity discontinuity and projects to a foreground velocity in the previous picture, whereas a foreground velocity projects to itself.

Preferably a checking means 9 is connected to a projecting means 6 and 7, which means checks if the two projections yield the same vector. If so, the identification is certain.

Figure 9:
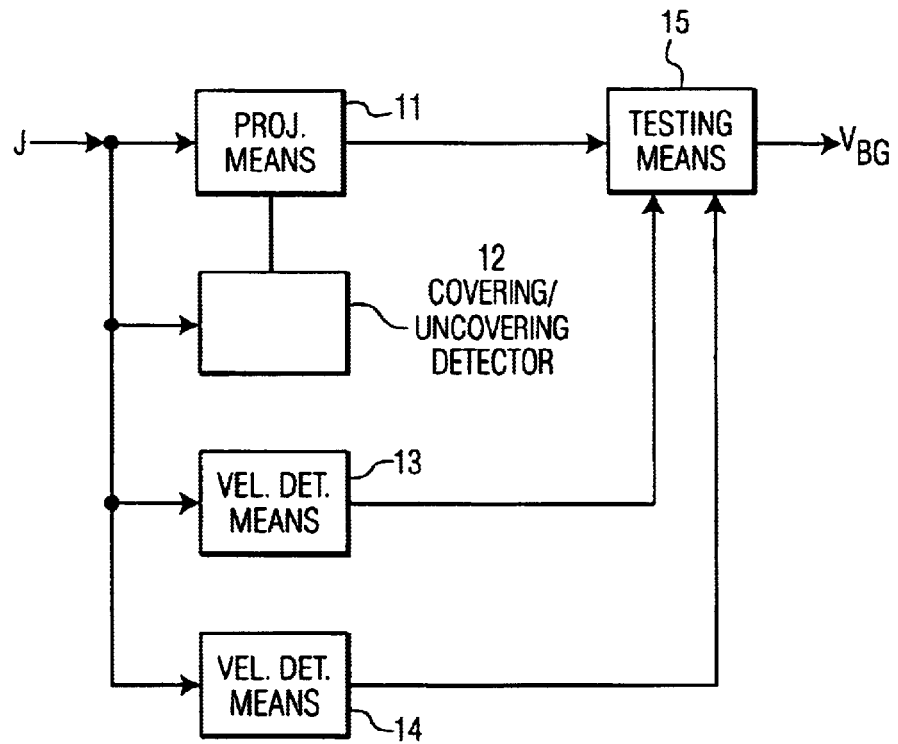
FIG. 9 shows a further embodiment of a foreground/background detector according to the invention.

In FIG. 9 a further embodiment of a foreground/ background detector is shown. This detector is also controlled by a covering/uncovering detector 12. In the detector of FIG. 9 an image signal J is supplied to the input of a projecting means 11, which under the control of the covering/uncovering detector 12 projects the discontinuity to the previous vector filled in the covering situation and to the future vector field in the uncovering situation. Furthermore, means 13 for determining the velocity on one side of the discontinuity and means 14 for determining the velocity on the other side of the discontinuity are provided. The determined velocities are supplied to testing means 15 from the output of means 13 and 14. Said testing means 15 is connected to the projecting means 11 for testing whether the edge has moved over the first vector on one side of the discontinuity or over the second vector on the other side of the discontinuity. The testing means 15 delivers the background vector $V_{\vec{B}}G$, which background vector is the second (first) vector in case the discontinuity moves with the first (second) vector.

Furthermore filling means could be connected to the testing means 20, which filling means fills the first (second) vector in those regions of the projected vector field in the environment of the discontinuity, to which no vector is projected, in case a foreground vector should be filled in and the other vector is filled in, in case a background vector should be filled.

Figure 10:
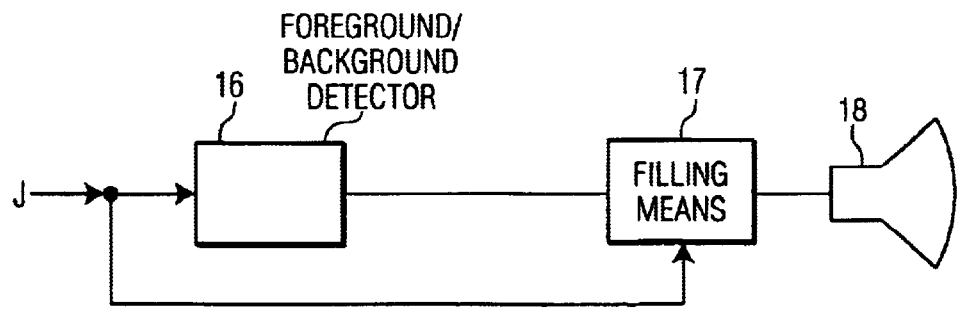
FIG. 10 shows an image display apparatus according to the invention.

In FIG. 10 an image display apparatus is shown. This apparatus comprises a foreground/background detector 16 for detecting a foreground/background vector. An image signal J is supplied to the detection 16 and also to means 17 for filling the detected foreground and/or background vectors in images. The detected motion vectors at the output of the detector 16 are supplied to the input of filling means 17. The output of the filling means 17 is applied to a display device 18. The detector 16 could be implemented according to one of above described detectors

What is claimed is:

1. A method for detecting the foreground or background vector near a discontinuity in a vector field, characterized in that the method comprises determining whether covering or uncovering situation exists, that, at the position $\vec{x}_1$ of the discontinuity, the method comprises the steps:

calculating a first position $\vec{x}_a$ in the previous (covering) or next (uncovering) vector field by shifting $\vec{x}_1$ over the first vector at one side of the discontinuity;

calculating a second position $\vec{x}_b$ in the previous (covering) or next (uncovering) vector field by shifting $\vec{x}_1$ over the second vector at the other side of the discontinuity; and calculating a third intermediate position between $\vec{x}_a$ and $\vec{x}_b$, wherein the vector fetched with $v_{\vec{a}}$ at the third position in the previous (covering) or next (uncovering) vector field is the background vector.

2. The method as claimed in claim 1, characterized in that the intermediate position is $(\vec{x}_a + \vec{x}_b)/2$.

3. The method as claimed in claim 1, characterized in that the vector fetched with $v_{\vec{a}}$ at the first position in the previous (covering) or next (uncovering) image is filled in those regions of the image in the environment of the edge, to which no vector is projected, in case the background vector $v_{\vec{B}}G$ should be filled in, and the vector chosen between $$\vec{D}\left(\vec{x} - \begin{pmatrix}1\\0\end{pmatrix}, n\right) \text{ and } \vec{D}\left(\vec{x} + \begin{pmatrix}1\\0\end{pmatrix}, n\right)$$

which is most different from $v_{\vec{a}}$ vis filled in, in case a foreground vector $v_{\vec{F}}G$ should be filled in.

4. A method for detecting the foreground or background vector near a discontinuity in a vector field, characterized in that the method comprises the steps:

determining whether covering or uncovering situation exists;

projecting the discontinuity to the previous vector field in the covering situation and to the future vector field in the uncovering situation; and testing, near discontinuities, whether the mentioned edge has moved over the first vector on one side of the discontinuity, or over the second vector on the other side of the discontinuity, wherein, in case the discontinuity moves with the first (second) vector, the second (first) vector is the background vector $v_{\vec{B}}G$.

5. The method as claimed in claim 4, characterized in that the mentioned edge has moved over the first vector on one side of the edge, or over the second vector on the other side of the edge, in case the edge moves with the first vector with which the discontinuity moves, is filled in those regions of the projected vector field in the environment of the discontinuity, to which no vector is projected, in case a foreground vector $v_{\vec{F}}G$ should be filled in, and the other vector is filled in, in case a background vector $v_{\vec{B}}G$ should be filled.

6. A detector for detecting the foreground or background vector near a discontinuity in a vector field, characterized in that said detector comprises:

a covering-uncovering detector for determining whether covering or uncovering situation exists;

calculating means for calculating, at the position $\vec{x}_1$ of the discontinuity, a first position $\vec{x}_a$ in the previous (covering) or next (uncovering) vector field by shifting $\vec{x}_1$ over the first vector at one side of the discontinuity, a second position $\vec{x}_b$ in the previous (covering) or next (uncovering) vector field by shifting $\vec{x}_1$ over the second vector at the other side of the discontinuity, and a third intermediate position between $\vec{x}_a$ and $\vec{x}_b$; and means for fetching the background vector with $v_{\vec{a}}$ at the third position in the previous (covering) or next (uncovering) vector field.

7. The detector as claimed in claim 6, characterized in that the intermediate position is $(\vec{x}_a + \vec{x}_b)/2$.

8. The detector as claimed in claim 6, characterized in that the vector fetched with $v_{\vec{a}}$ at the first position in the previous (covering) or next (uncovering) image is filled in those regions of the image in the environment of the edge, to which no vector is projected, in case the background vector $v_{\vec{B}}G$ should be filled in, and the vector chosen between $$\vec{D}\left(\vec{x} - \begin{pmatrix}1\\0\end{pmatrix}, n\right) \text{ and } \vec{D}\left(\vec{x} + \begin{pmatrix}1\\0\end{pmatrix}, n\right)$$

which is most different from $v_{\vec{a}}$ vis filled in, in case a foreground vector $v_{\vec{F}}G$ should be filled in.

9. A detector for detecting the foreground or background vector near a discontinuity in a vector field, characterized in that said detector comprises:

a covering-uncovering detector for determining whether covering or uncovering situation exists;

means for projecting the discontinuity to the previous vector field in the covering situation and to the future vector field in the uncovering situation; and testing means for testing near discontinuities whether the mentioned edge has moved over the first vector on one side of the discontinuity, or over the second vector on the other side of the discontinuity, wherein, in case the discontinuity moves with the first (second) vector, the second (first) vector is the background vector $v_{\vec{B}}G$.

10. The detector as claimed in claim 9, characterized in that the mentioned edge has moved over the first vector on one side of the edge, or over the second vector on the other side of the edge, in case the edge moves with the first (second) vector with which the discontinuity moves, the second (first) vector is filled in those regions of the projected vector field in the environment of the discontinuity, to which no vector is projected, in case a foreground vector $v_{\vec{F}}G$ should be filled in, and the other vector is filled in, in case a background vector $v_{\vec{B}}G$ should be filled.

11. An image display apparatus comprising:

a covering-uncovering detector for determining whether covering or uncovering situation exists;

calculating means for calculating, at the position $\vec{X}_1$ of the discontinuity, a first position $\vec{X}_a$ in the previous (covering) or next (uncovering) vector field by shifting $\vec{X}_1$ over the first vector at one side of the discontinuity, a second position $\vec{X}_b$ in the previous (covering) or next (uncovering) vector field by shifting $\vec{X}_1$ over the second vector at the other side of the discontinuity, and a third intermediate position between $\vec{X}_a$ and $\vec{X}_b$; and means for fetching the background vector with $V_{av}$ at the third position in the previous (covering) or next (uncovering) vector field.

filling means for filling the foreground/background vector detected by the detector; and a display device connected to the filling means.

* * * * *